(12) United States Patent
Delanghe et al.

(10) Patent No.: US 9,809,932 B2
(45) Date of Patent: Nov. 7, 2017

(54) TRACTION DEVICE (71) Applicant: Caliber, Inc., Burnsville, MN (US)

(72) Inventors: Ernest J. Delanghe, Burnsville, MN (US); Paul Dathe, Plymouth, MN (US)

(73) Assignee: Caliber, Inc., Burnsville, MN (US)

( * ) Notice: Subject to any disclaimer, the term of this patent is extended or adjusted under 35 U.S.C. 154(b) by 84 days.

(21) Appl. No.: 14/707,483

(22) Filed: May 8, 2015

(65) Prior Publication Data
US 2015/0367682 A1 Dec. 24, 2015

Related U.S. Application Data (60) Provisional application No. 61/990,446, filed on May 8, 2014.

(51) Int. Cl.
B60B 39/12 (2006.01)
E01B 23/00 (2006.01)

(52) U.S. Cl.
CPC .............. E01B 23/00 (2013.01); B60B 39/12 (2013.01)

(58) Field of Classification Search
CPC ... B60B 39/12; B60B 2900/721; B60B 39/00; B60B 15/24; E01C 11/24; E01C 9/083; E01C 9/086; E04F 15/02172; E04F 11/112; Y10T 428/24479; E01B 23/00

USPC ........................................................ 238/14
See application file for complete search history.

(56) References Cited

U.S. PATENT DOCUMENTS

| D88,836 S | * | 12/1932 | Wheeler | D25/160 |
| 2,225,828 A | * | 12/1940 | Godschall | B60B 39/12 238/14 |
| D140,623 S | * | 3/1945 | Harper | 404/19 |
| 3,425,624 A | * | 2/1969 | Jacobs | B60B 39/12 238/14 |
| 3,997,110 A | * | 12/1976 | Aumont | B60B 39/12 238/14 |
| 4,211,366 A | * | 7/1980 | Czarnota | B60B 39/12 238/14 |

* cited by examiner

Primary Examiner — Mark Le
(74) Attorney, Agent, or Firm — Peter J. Ims; Westman, Champlin & Koehler, P.A.

(57) ABSTRACT

A traction device to engage a track of a tracked vehicle includes spaced apart longitudinal ribs and spaced apart transverse ribs forming a matrix, with at least one longitudinal rib having first gripping elements spaced apart to engage a track of a vehicle having lugs spaced at a first pitch and at least one other longitudinal rib having second gripping elements spaced apart to engage a track of a vehicle having lugs spaced at a second pitch. A number of third gripping elements are arranged across a width of each of the transverse ribs, and the transverse ribs are spaced to engage a track of a vehicle having lugs spaced at a third pitch.

26 Claims, 10 Drawing Sheets

TRACTION DEVICE

CROSS REFERENCE TO RELATED APPLICATION

This application claims priority to Provisional Patent Application No. 61/990,446, on May 8, 2014, the disclosure of which is incorporated by reference in its entirety.

BACKGROUND

The present disclosure relates to a device that is attachable to a surface, such as a trailer bed, a tail gate or an end gate that provides traction to a snowmobile track or a tire on a vehicle, such as, but not limited to, a studded tire on a motorcycle, or another tracked vehicle, as the snowmobile or vehicle is moved over the trailer bed, the tail gate or the end gate. More particularly, the present disclosure relates to a flexible plastic or ridged matrix component that is configured to be attached to a trailer bed, tailgate or end gate where the matrix component is configured to engage any of the standard lug pitches of a snowmobile track to assist in moving the snowmobile or a wheeled vehicle across the trailer bed, the tail gate or the end gate.

Typically snowmobiles are transported on a trailer or a truck bed to and from a desired location. In order to maneuver the snowmobile onto a bed of the trailer or the truck, typically either a tailgate or an end gate is utilized to provide a transition from the ground surface to the elevated bed. It is also contemplated that the trailer bed be able to be tilted to provide a transition from the ground surface to the trailer bed.

A typical construction of a bed of a snowmobile trailer or truck bed includes a deck that is typically constructed of wood. It is also contemplated that the deck could be a composite construction where a composite material is secured to the top surface of the bed or where a metal sheet, typically aluminum, is secured to the top surface of the deck.

Many snowmobile riders have problems loading their snowmobiles onto the deck of the trailer and/or truck bed because the surfaces are slippery due to snow, ice and cold conditions. The snowmobile riders typically have problems with the snowmobile track spinning and slipping while attempting to load a snowmobile, especially on inclined surfaces, such as but not limited to, a trailer door, an end gate, a tail gate or a tilt trailer.

A track of a snowmobile is typically a continuous loop that travels along a longitudinal axis and a plurality of lugs attached to the track in a direction transverse to the longitudinal axis. A distance between the plurality of lugs in the direction of the longitudinal axis is referred to the track pitch. Typically a snowmobile has one of three standard track pitches, which include 2.52 inches, 2.86 inches and 3.0 inches.

A typical product is secured to the deck of a trailer or a bed at a selected distance apart from each other, typically a distance of 10" between parts. Although this type of product can be useful, due to the track pitch, the lugs will engage the product only after first spinning on the deck of the trailer or truck. Once a lug engages the product, the track will have traction until the lug disengages the product. As such a cycle of spinning and slippage of the track on the deck followed by intermittent gripping occurs, which can cause damage to both the track and the deck over time.

SUMMARY

The present disclosure relates to a traction device that is configured to be secured to a deck of a trailer or a truck, an end gate or a tailgate. The traction device is typically of a monolithic construction that is molded from a polymeric material. The traction device includes a plurality of spaced apart longitudinal ribs that are substantially parallel to a longitudinal axis and a plurality of spaced apart transverse ribs that are substantially perpendicular to the longitudinal axis. The plurality of longitudinal ribs and the plurality of transverse ribs are interconnected to provide the necessary rigidity and structural integrity to withstand a force provided by a snowmobile track while a having a sufficiently low profile to allow a person to easily walk over the traction device. The plurality of spaced apart transverse ribs includes a plurality of staggered gripping elements across a length of each transverse rib. Each of the gripping elements comprises a ramped leading edge and a substantially vertical trailing edge that is configured to engage the lugs of the snowmobile track. The plurality of spaced apart transverse ribs are configured to engage the lugs of a track with a 2.52 inch track pitch, such that the lugs of the 2.52 inch pitch track engage a plurality of the gripping elements of the spaced apart transverse ribs and interlace with the plurality of the gripping elements on the plurality of spaced apart transverse ribs. Each of the plurality of longitudinal ribs includes spaced apart gripping elements placed and configured to engage lugs on either a track with a 2.86 inch track pitch or a 3.0 inch track pitch. The gripping elements for the 2.86 inch track pitch are on a separate longitudinal rib relative to the 3.0 inch track pitch to prevent interference between the placement of the gripping elements for the respective track pitch. The placement of the gripping elements on the longitudinal ribs allows the lugs of either the 2.86 inch or 3.0 inch track pitch to engage the gripping elements on the bottom transverse rib and then sequentially grip the positioned gripping elements on the longitudinal ribs to intermesh the lugs with the gripping elements which prevents slippage as the track, whether a 2.52 inch, 2.86 inch or 3.0 inch track pitch, as the snowmobile track engages the traction device while maintain a low profile for users to walk on while entering or exiting the trailer.

In one aspect, a traction device configured to engage a track of a tracked vehicle includes a number of spaced apart longitudinal ribs and a number of spaced apart transverse ribs that engage the spaced apart longitudinal ribs such that a matrix is formed, at least one longitudinal rib having first gripping elements spaced apart to engage a track having lugs spaced at a first pitch and at least one longitudinal rib having second gripping elements spaced apart to engage a track having lugs spaced at a second pitch.

In another aspect, a traction device for a tracked vehicle includes a matrix having a number of spaced apart longitudinal ribs and a number of spaced apart transverse ribs, the longitudinal ribs and the transverse ribs substantially perpendicular to one another, a first set of gripping elements spaced apart along at least one of the longitudinal ribs, the first set of gripping elements spaced to engage a track having lugs spaced at a first pitch, a second set of gripping elements spaced apart along at least one other of the longitudinal ribs, the second set of gripping elements spaced to engage a track having lugs spaced at a second pitch, and a third set of gripping elements spaced apart along a width of each of the transverse ribs, wherein adjacent transverse ribs are spaced apart from each other at a distance to engage a track having lugs spaced at a third pitch.

In another aspect, a traction device configured to engage a snowmobile track with a 2.52 inch pitch, a 2.86 pitch or a 3.0 inch pitch includes a number of spaced apart longitudinal ribs, at least one rib having gripping elements spaced apart to engage lugs on a snowmobile track with a pitch of 3.0 inches and at least one longitudinal rib having gripping elements spaced apart to engage lugs on a snowmobile track with a pitch of 2.86 inches, and a number of spaced apart transverse ribs that engage the spaced apart longitudinal ribs such that a matrix is formed, wherein the number of spaced apart transverse ribs have a number of gripping elements across a width thereof, wherein the spaced apart gripping elements on the transverse ribs are spaced to engage lugs on a snowmobile track with a pitch of 2.52 inches.

DETAILED DESCRIPTION

Figure 1:
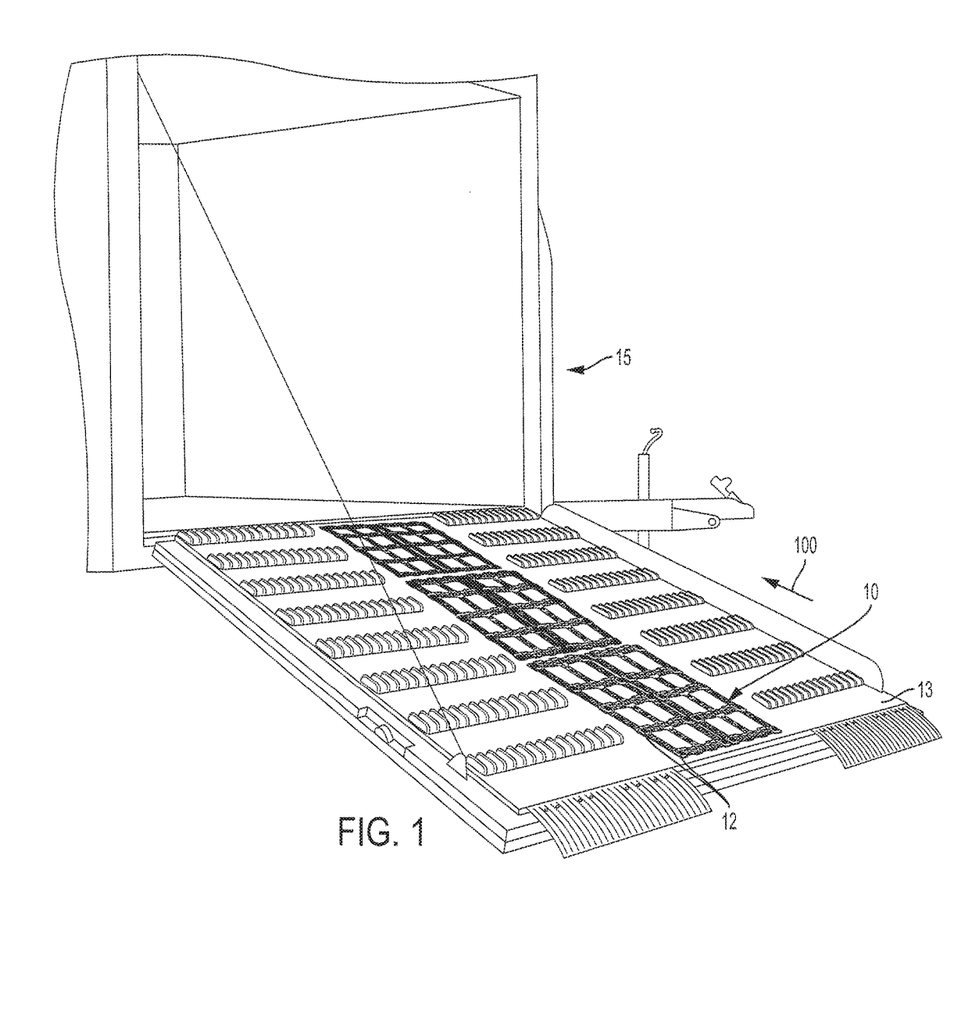
FIG. 1 is a perspective view of an end gate of a trailer with traction devices attached thereto.

A traction device configured to be secured to a bed of a trailer, a truck, a tailgate and/or an end gate is generally illustrated in FIG. 1 at 10, as shown secured to an end gate 13 of a trailer 15 therein. The traction device 10 is in one embodiment molded from a polymeric material (e.g., a thermoplastic polyolefin) and is of a monolithic construction, wherein the traction device 10 includes strategically located and spaced apart gripping elements 12 such that the traction device 10 can accommodate snowmobile tracks having one of the three typical track pitches, namely, 2.52 inches, 2.86 inches or 3.0 inches without slippage on the traction device 10. Therefore, the traction device 10 allows the lugs of the snowmobile track to interlace with multiple gripping elements 12 along the length of the traction device 10 to provide improved gripping and traction to the snowmobile track when the traction device 10 is secured to a trailer, truck, tailgate, end gate, other transport structure, or the like as discussed herein. While three track pitches are discussed, it should be understood that the traction device 10 may be modified to engage additional or different track pitches or combinations thereof, without departing from the scope of the disclosure.

Figure 2:
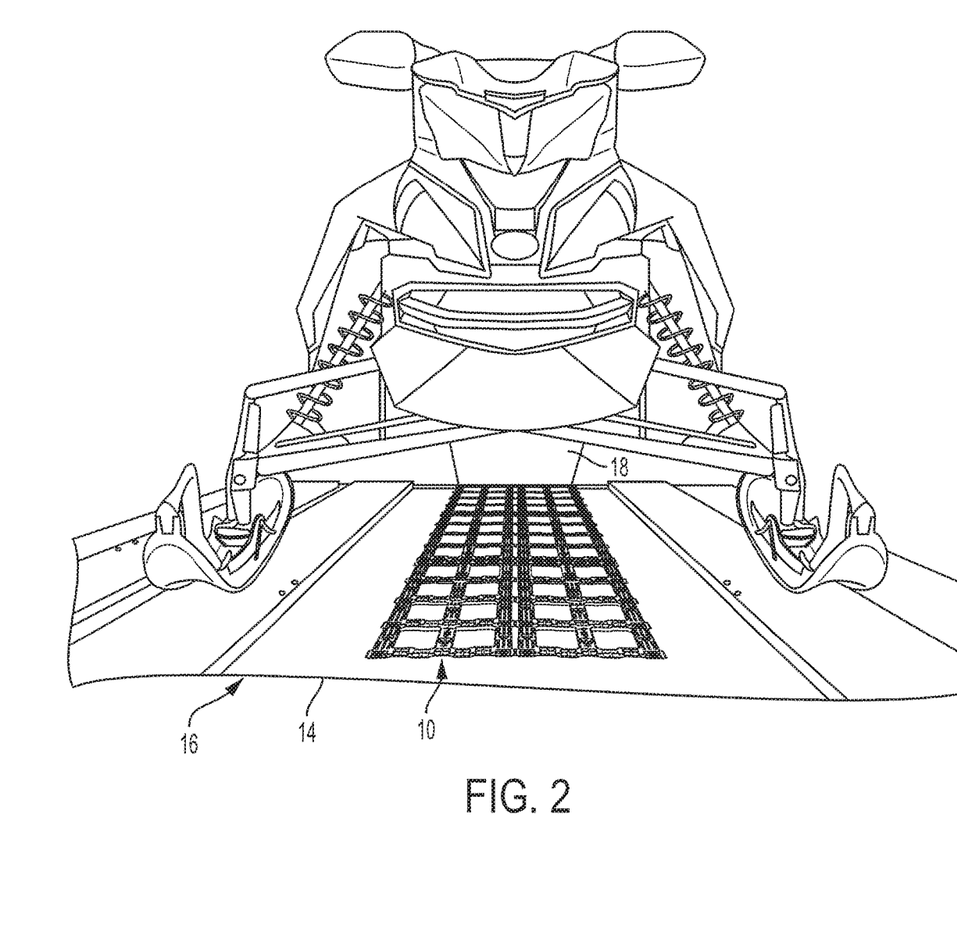
FIG. 2 is a perspective view of a tiltable trailer having a plurality of traction devices attached thereto.
Figure 3:
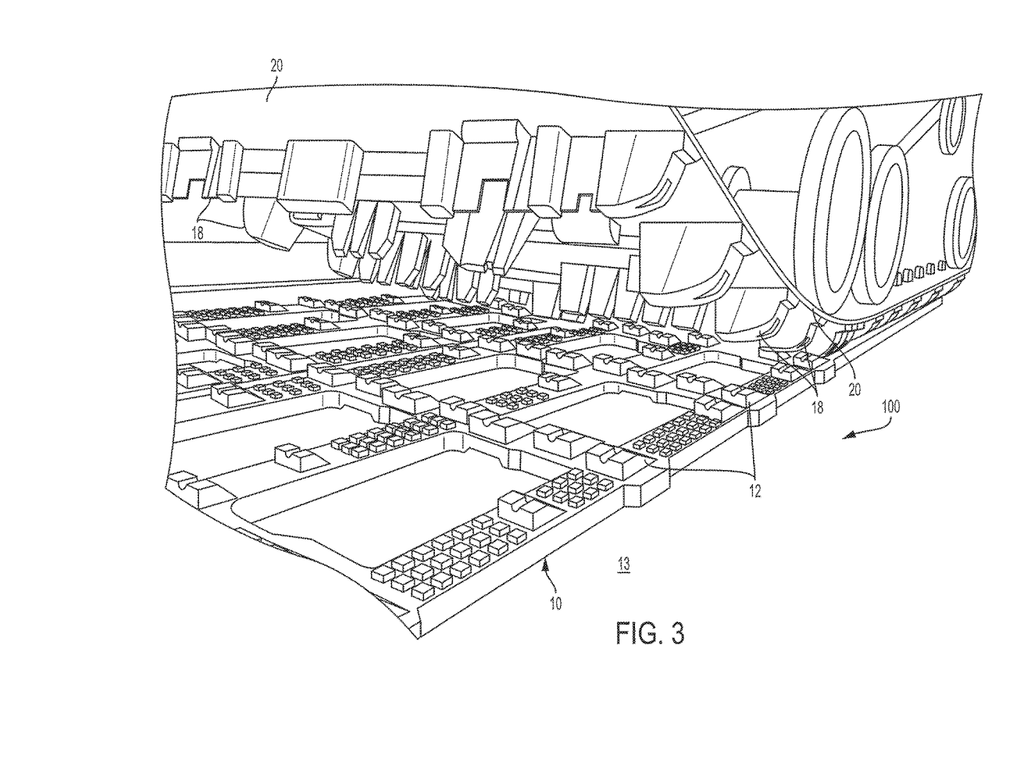
FIG. 3 is a perspective view of a track of a snowmobile having lugs engaging the traction device secured to a bed of a trailer.

Referring to FIGS. 2 and 3, a plurality of the traction devices 10 can be aligned and attached to the bed 13 of a trailer 16, for instance, to provide a gripping surface along a desired length of the bed 13 such that the lugs 18 of the track 20 engage the spaced apart gripping elements generally identified in FIGS. 1-3 as gripping elements 12. Therefore, as the lugs 18 engage and intermesh with the successive gripping elements 12 the interaction between the gripping elements 12 and the lugs 18 causes the snowmobile to move along the trailer 16 with improved traction and without unnecessary slippage.

Figure 4:
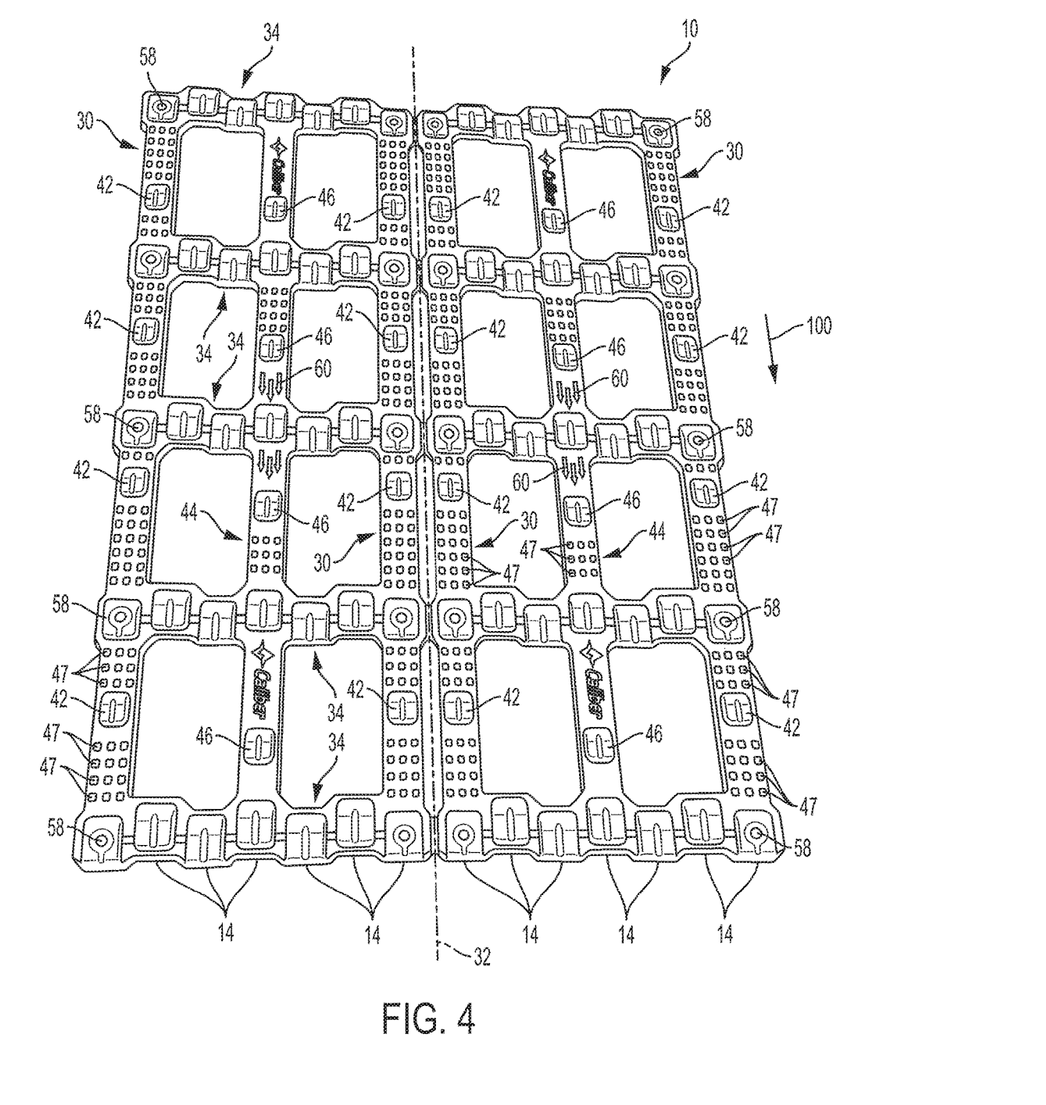
FIG. 4 is perspective view of an embodiment of a traction device.
Figure 5:
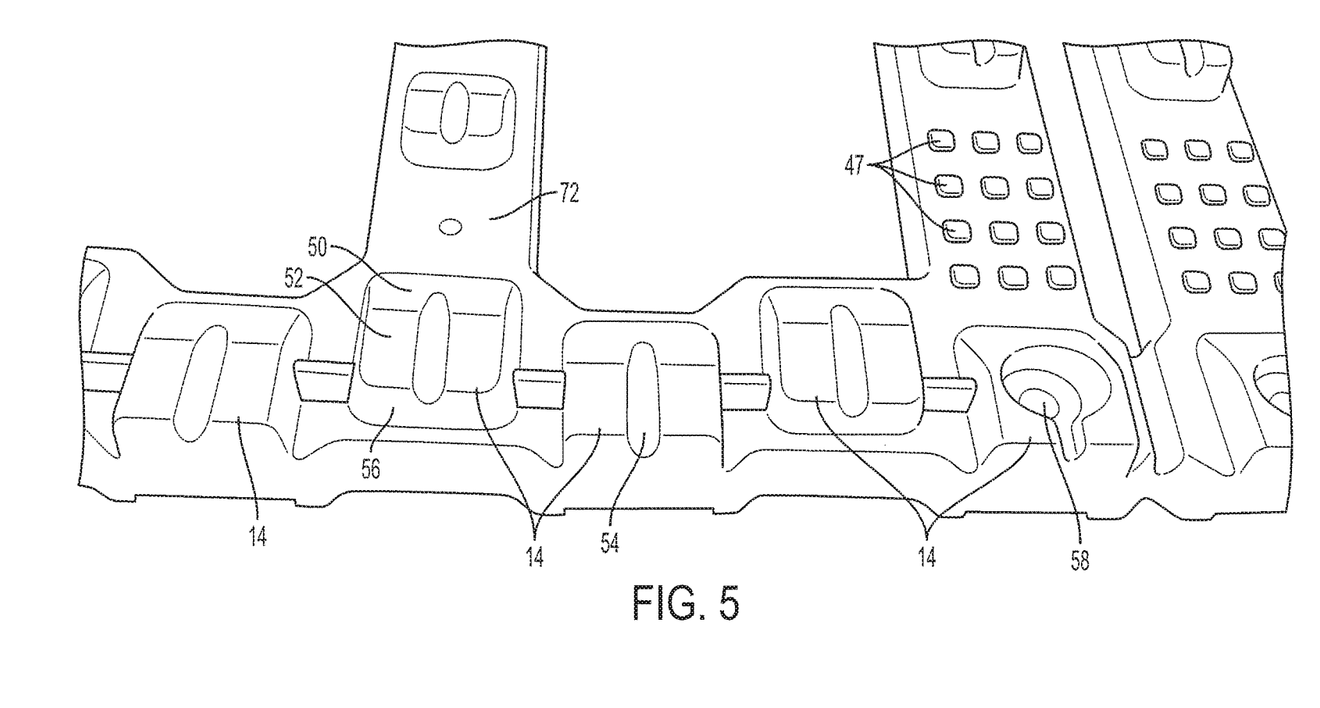
FIG. 5 is an enlarged view of a portion of the perspective view of FIG. 4.

Referring to FIGS. 4 and 5, the traction device 10 includes a plurality of spaced apart longitudinal ribs 30 and 44 that are substantially parallel to a longitudinal axis 32. The traction device 10 includes a plurality of spaced apart transverse ribs 34 that are substantially perpendicular to the longitudinal axis 32, and include transverse rib specific gripping elements 14. The transverse ribs 34 intermesh with the plurality of spaced apart longitudinal ribs 30 to provide the necessary structural integrity or strength to allow traditional snowmobile tracks such as rubber matrix construction tracks, Kevlar® construction tracks, composite tracks, including snowmobile tracks with paddle cleats and/or studs, as well as snowmobile tracks with either metal or plastic lugs 18 to engage the gripping elements 14 and move along the traction device 10.

Figure 10:
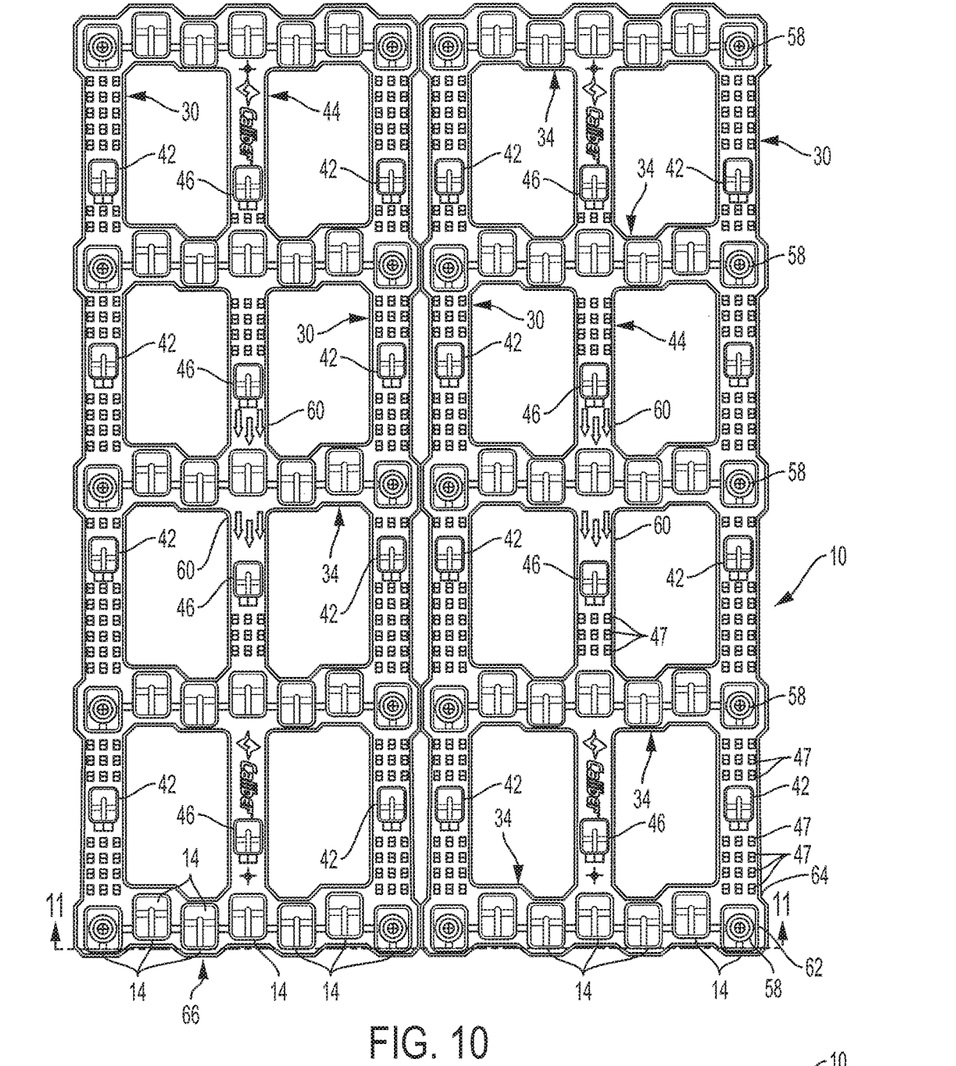
FIG. 10 is a top view of the traction device of FIG. 4.

The plurality of spaced apart transverse ribs 34 in one embodiment include a plurality of staggered transverse rib gripping elements 14 along a widthwise length of each transverse rib 34. The plurality of spaced apart transverse ribs 34 are spaced apart in one embodiment to engage every other set of lugs on a snowmobile track having a track pitch of 2.52 inches. Therefore, a plurality of lugs will engage the transverse rib gripping elements 14 on a plurality of spaced apart transverse ribs 34 to cause an intermeshing thereof to provide better traction and prevent slippage. The staggering of gripping elements 14 is shown in greater detail in FIGS. 4 and 10. The gripping elements 14 of each transverse rib 34 are shown as alternating in position along the width of the rib 34. As shown in FIG. 10, some gripping elements 14 are aligned transversely with their trailing edges along a line indicated at 62, and other gripping elements 14 are aligned transversely with their trailing edges along a line indicated at 64. This allows in one embodiment a greater likelihood that a track engaging the device 10 will properly engage without significant slipping even with some misalignment of the track to the device. Although shown with two staggered sets of gripping elements along the longitudinal direction, it should be understood that more or fewer staggered sets of gripping elements 14 may be used without departing from the scope of the disclosure.

Each of the plurality of spaced apart longitudinal ribs 30 or 44 includes a series of gripping elements 42 or 46, separate from and additional to the gripping elements 14 at intersections of the transverse ribs 34 and longitudinal ribs 30 or 44. The gripping elements 42, 46 are positioned on a ribs 30 or 44 to engage either the lugs of a 2.86 inch track pitch track or a 3.0 inch track pitch track. As illustrated, the longitudinal ribs 30 include gripping elements 42 that are spaced apart to engage lugs on a track with a 2.86 inch pitch. The longitudinal ribs 44 include gripping elements 46 that are spaced apart to engage lugs on a track with a 3.0 inch pitch. The gripping elements 46 configured to engage lugs on a 3.0 inch pitch are located on separate longitudinal ribs 44 relative to the gripping elements 42 on the longitudinal ribs 30 to prevent interference between the placement of the gripping elements 42 and 46. The gripping elements 42 are configured in rows to engage a typical configuration of the lugs on a 2.86 inch track pitch track, while the gripping elements 46 are positioned in rows to engage a typical configuration of lugs on a 3.0 inch track pitch track.

While the disclosed device 10 has gripping elements 14, 42, 46 positioned to engage a track of a snowmobile having track pitches of 2.52 inches, 2.86 inches and 3.0 inches, respectively, the gripping elements can be positioned to engage a track with any desired track pitch. The gripping elements 14 can also be positioned to engage a wheeled vehicle, whether the wheels have studs or not, where the vehicle includes, but is not limited to, a snow bicycle. Further, while the gripping elements 14 are disclosed as engaging a 2.52 inch track pitch, the gripping elements 14 may be arranged so as the engage other track pitches instead, with the other gripping elements such as gripping elements 42, 46 engaging different pitch tracks as well, without departing from the scope of the disclosure.

Each of the gripping elements 14, 42 and 46 have a similar construction in one embodiment. Each gripping element 14, 42 and 46 has a ramped lead surface 50 that allows the lugs to easily climb the gripping elements when the motion of the vehicle is in a direction as shown in arrow 100 (FIGS. 1, 3, 8), that is, in a direction of vehicle motion in which the ramped surface 50 is engaged first by the motion of the vehicle, sometimes referred to herein as "loading" the vehicle, such as onto a trailer or other transport. This is especially helpful when the device 10 is mounted on an inclined surface. The gripping elements 14, 42 and 46 then transition in one embodiment to a substantially flat top surface 52 that includes in one embodiment a groove 54 extending along the longitudinal axis 32 to increase the strength of the gripping element. Extending downwardly from the substantially flat top surface 52 in one embodiment is a substantially vertical trailing surface 56 where the substantially vertical trailing surface 56 is configured to engage the lugs of a track and prevent slippage of the lugs over the gripping elements 14, 42 and 46.

Each of the plurality of longitudinal ribs 30 includes minor gripping elements 47 between the gripping elements 14, 42 and 46. The minor gripping elements 47 engage lugs on the track between the gripping elements 14, 42 and 46 to prevent slippage of the lugs on the longitudinal ribs 30. However minor gripping elements 47 do not have a sufficient height to provide a counteracting surface to the lugs to assist in propelling the snowmobile along the traction device 10.

The gripping device 10 includes a plurality of through bores 58 that are configured to pass a screw or bolt therethrough such that the gripping device 10 can be secured to a desired surface. While a screw or bolt is a contemplated securing device, other securing devices are also contemplated including, but not limited to a rivet and an adhesive. Through bores 58 in one embodiment are provided as through bores in a recess of some of gripping elements 14, although other through bores may be provided in different, alternative, or additional locations on the device 10, such as in gripping elements 42 and/or 46, or along longitudinal ribs and/or not in gripping elements 14, 42, or 46, without departing from the scope of the disclosure.

Figure 11:
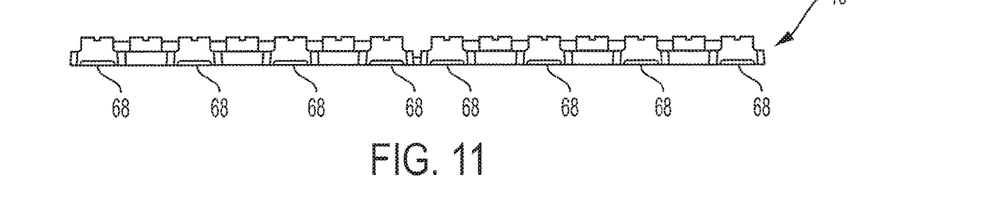
FIG. 11 is an end elevation view of the traction device of FIG. 4.

FIG. 10 is a top view of an embodiment of the traction device 10 shown in FIG. 4. FIG. 11 is an end elevation view of the traction device of FIG. 10 taken along line 11-11 thereof.

Figure 6:
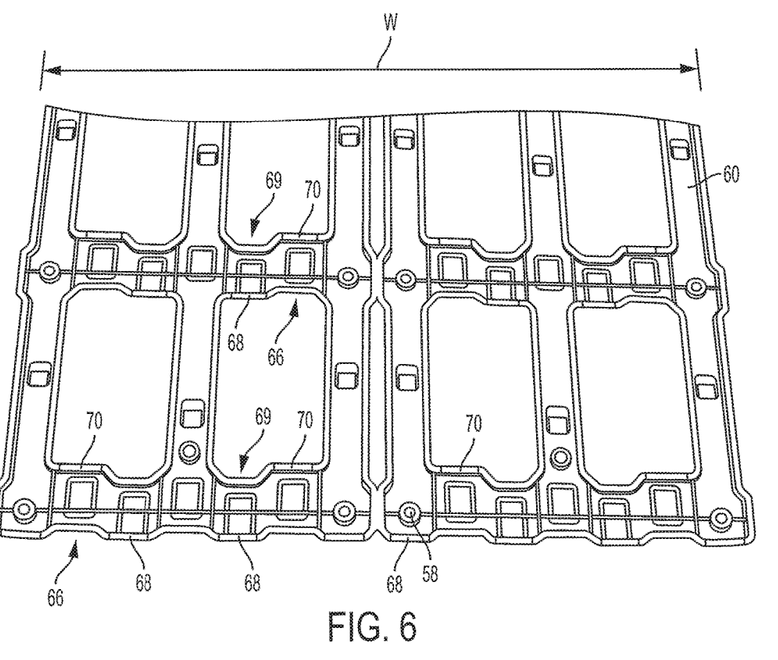
FIG. 6 is another perspective view of an embodiment of the traction device.
Figure 7:
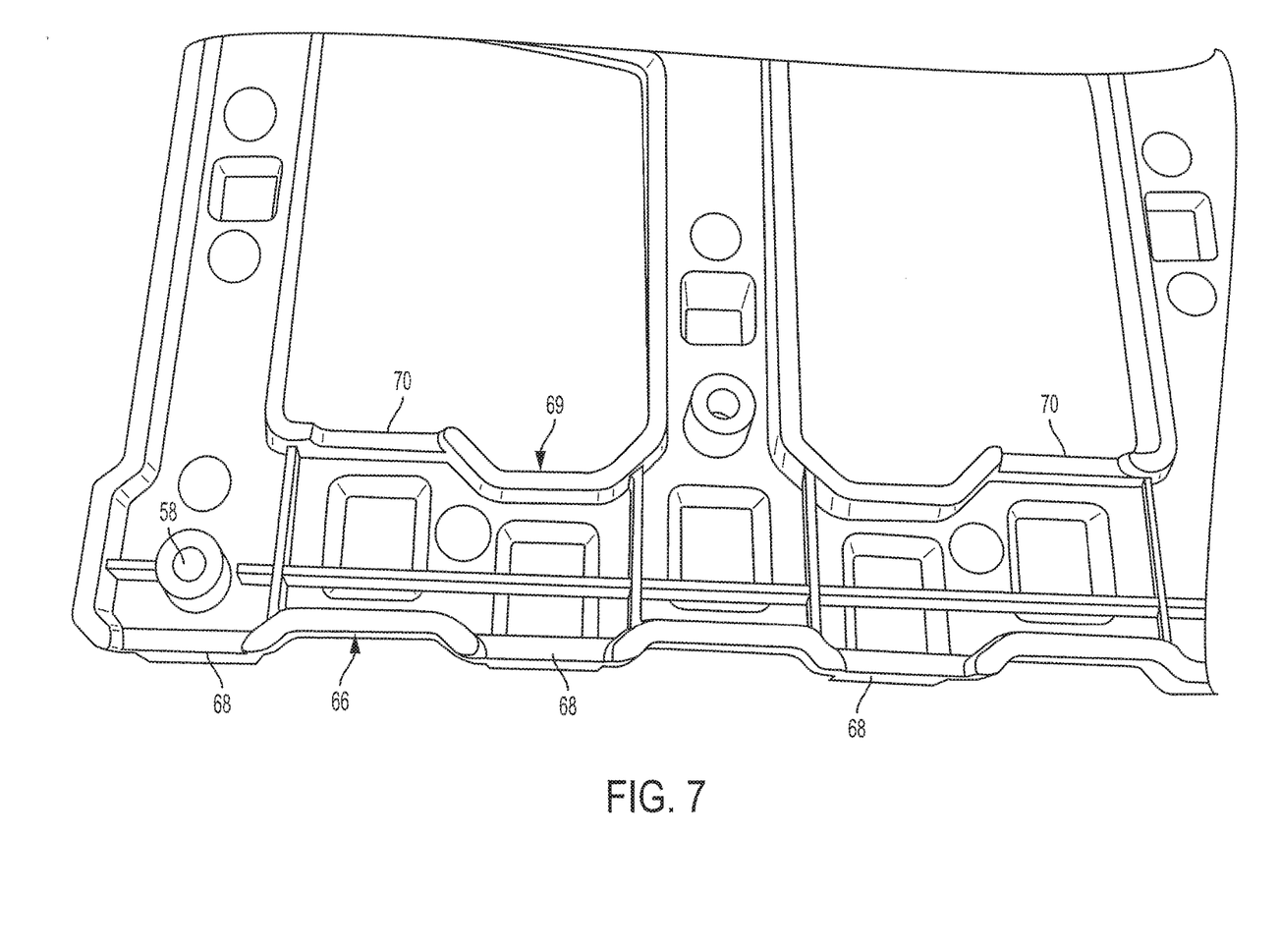
FIG. 7 is an enlarged view of a portion of the perspective view of FIG. 6.

Referring to FIGS. 6 and 7, a bottom surface 60 of the traction device is illustrated. The bottom surface 60 along with a top surface 72 defines a wall thickness. The wall thickness provides the necessary rigidity and structural integrity to allow the traction device 10 to have a relatively low profile such that a person can safely walk on the traction device 10, while also providing the necessary structure to allow the lugs of the track of the snowmobile to engage the gripping elements 14, 42 and 46 such that the snowmobile track does not slip on the gripping device and includes a plurality of contact surfaces that can be simultaneously engaged to cause an interlocking or intermeshing of the lugs with the gripping members 14, 42, and 46. Also, because of the wall thickness, the traction device 10 is relatively light and can be used on tail gates and end gates without causing an excess amount weight to be placed on the gate, such that the gate can be easily maneuvered.

In one embodiment, a leading edge 66 of each of the plurality of spaced apart transverse ribs 34 includes a plurality of cut outs 68 that allow water to flow into the transverse rib 34 under the top surface 72. A trailing edge 69 of each of the plurality of spaced apart transverse ribs 34 includes a plurality of cutouts 70 that cooperate with the plurality of cut outs 68 in the leading edges 66 such that water can flow through the traction devices 10 and prevent degradation of the surface onto which the traction device 10 is secured.

A typical width W of the traction device 10 is about 16 inches, which accommodates most snowmobile tracks without any overhang beyond the edges of the traction device that defines the width W. However, other widths are also contemplated.

Figure 8:
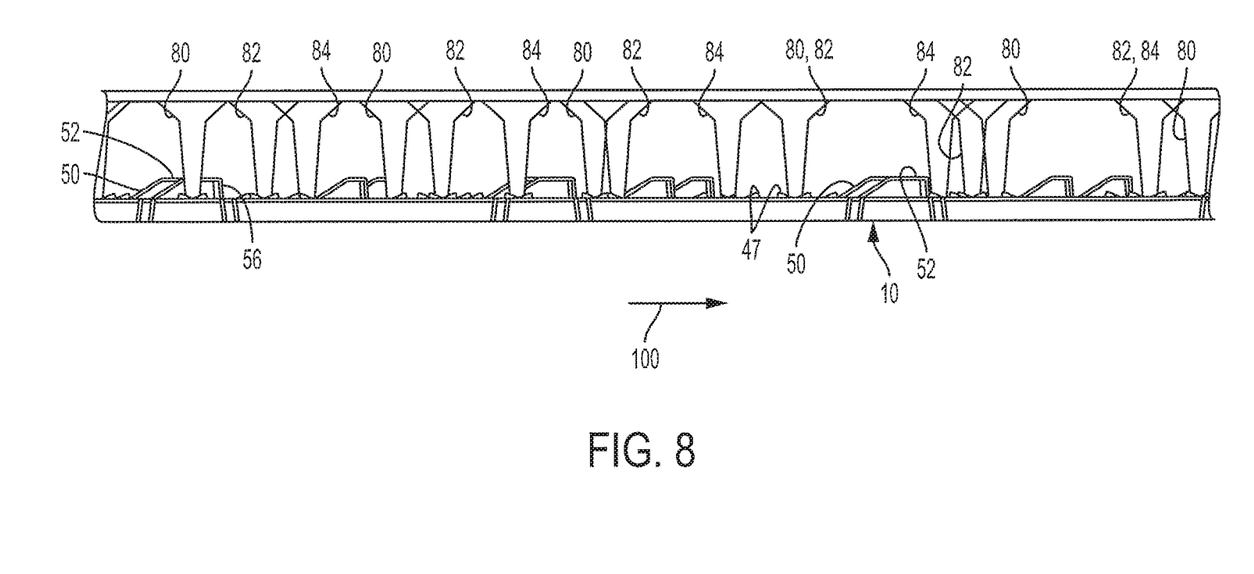
FIG. 8 is a schematic view of the lugs of three track pitches of a snowmobile engaging an embodiment of the traction device.

Referring to FIG. 8, the traction device 10 is illustrated engaging lugs 80 having a 2.86 inch track pitch, lugs 82 having a 2.52 inch track pitch and lugs 84 having a 3.0 inch track pitch. FIG. 6 illustrates that the traction device 10 is capable of being universally used to provide traction to any of the three typical track pitches for a snowmobile and therefore the user does not have to consider the track pitch when selected the disclosed traction device 10.

Figure 9:
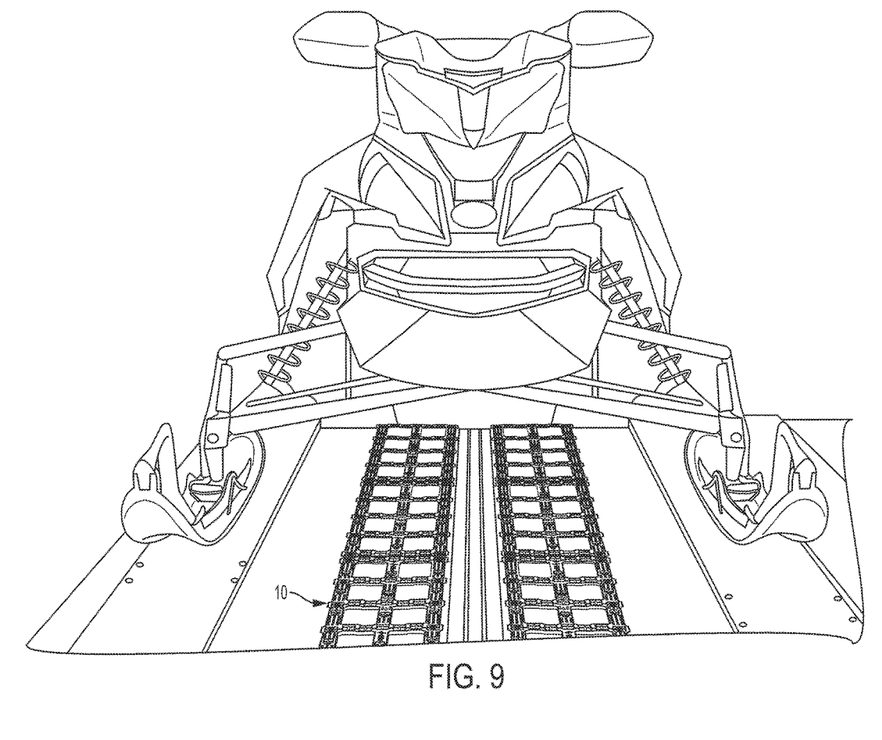
FIG. 9 is a perspective view of an embodiment of a traction device secured to a trailer in halves separated about a rail.

In one embodiment, the device 10 includes two halves, a half on each side of the longitudinal axis 32, which may be split to allow the halves of the device 10 to be arranged and secured on a trailer or the like with a rail system, as shown in FIG. 9.

More than one traction device 10 may be installed along, for example, a bed of a trailer, a truck, a tailgate and/or an end gate a trailer bed, to provide a longer track of improved traction. In one embodiment, a second traction device 10 is installed at a distance from the first installed traction device so as to continue the spacing for lug engagement. In one embodiment, the distance between longitudinally adjacent traction devices 10 is 3⅞ inches. For different track pitches, the spacing between longitudinally adjacent traction devices may be adjusted to accommodate the specific track pitch, without departing from the scope of the disclosure.

The embodiments of the disclosure assist both in loading and unloading of tracked vehicles from a trailer, a truck, a tailgate, and/or an end gate or the like, especially when the surface on which the device 10 is mounted is inclined. The substantially vertical trailing surfaces 56 of the device 10, when the device 10 is mounted to an inclined surface, act to retard slipping movement of a tracked vehicle down the inclined surface when it is being unloaded from the trailer, truck, tailgate, end gate, or the like. This is accomplished in one embodiment by the trailing surfaces 56 engaging the lugs, studs, or paddles of the track of the tracked vehicle.

Although the present disclosure has been made with reference to preferred embodiments, workers skilled in the art will recognize that changes may be made in form and detail without departing from the scope of the disclosure.

What is claimed is:

1. A traction device configured to engage a track of a snowmobile as the snowmobile moves in a direction of travel, comprising:
 a plurality of spaced apart longitudinal ribs substantially aligned with the direction of travel and a plurality of spaced apart transverse ribs that interconnect the plurality of spaced apart longitudinal ribs, a first longitudinal rib of the plurality of spaced apart longitudinal ribs having a plurality of first raised gripping elements spaced apart to engage a track having lugs spaced at a first pitch and a second longitudinal rib of the plurality of spaced apart longitudinal ribs having a plurality of second raised gripping elements spaced apart to engage a track having lugs spaced at a second pitch and a plurality of third raised gripping elements across a width of each of the plurality of transverse ribs, wherein the transverse ribs are spaced to engage a track having lugs spaced at a third pitch wherein the first pitch is 2.86 inches, wherein the second pitch is 3.0 inches, and wherein the third pitch is 2.52 inches.

2. The traction device of claim 1, wherein the device comprises two longitudinal halves, the halves splittable from each other for mounting a half on either side of an obstacle.

3. The traction device of claim 1, and further comprising a plurality of through bores configured to allow mounting of the traction device to a surface.

4. The traction device of claim 1, and further comprising a plurality of through bores within the plurality of spaced apart longitudinal ribs and/or the plurality of spaced apart transverse ribs, wherein the plurality of through bores is configured to allow mounting of the traction device to a surface.

5. The traction device of claim 4, wherein the plurality of through bores are located through at least some of the third plurality of gripping elements.

6. The traction device of claim 1, and further comprising a plurality of cutouts along a first face of each of the transverse ribs, and a plurality of cutouts along a second, opposite face of each of the transverse ribs.

7. The traction device of claim 1, wherein the transverse rib gripping elements are staggered in a longitudinal direction along a width of the transverse rib.

8. The traction device of claim 1, and further comprising a plurality of minor gripping elements, the plurality of minor gripping elements arranged on the longitudinal ribs between respective first gripping elements and between respective second gripping elements.

9. The traction device of claim 1, wherein each of the first and the second pluralities of gripping elements comprises a ramped surface and a substantially vertical trailing surface, the ramped surface and substantially vertical trailing surface connected by a substantially flat top surface.

10. The traction device of claim 9, wherein each substantially top flat surface has a longitudinal groove therein substantially parallel to the longitudinal ribs.

11. A traction device for a snowmobile as the snowmobile moves in a direction of travel, the traction device comprising:
 a matrix having a plurality of spaced apart longitudinal ribs interconnected with a plurality of spaced apart transverse ribs, the longitudinal ribs being substantially aligned with the direction of travel;
 a first plurality of raised gripping elements spaced apart along a first longitudinal rib of the plurality of longitudinal ribs, the first plurality of gripping elements spaced to engage a track having lugs spaced at a first pitch;
 a second plurality of raised gripping elements spaced apart along a second longitudinal rib of the plurality of longitudinal ribs, the second plurality of gripping elements spaced to engage a track having lugs spaced at a second pitch;
 a third plurality of raised gripping elements spaced apart along a width of each of the transverse ribs, wherein adjacent transverse ribs are spaced apart from each other at a distance to engage a track having lugs spaced at a third pitch; and
 and further comprising a plurality of cutouts along a first face of each of the transverse ribs, and a plurality of cutouts along a second, opposite face of each of the transverse ribs.

12. The traction device of claim 11, wherein the spacing of adjacent transverse ribs is twice the third pitch.

13. The traction device of claim 11, and further comprising a plurality of minor gripping elements, the plurality of minor gripping elements arranged on at least one of the longitudinal ribs between respective first gripping elements and between respective second gripping elements.

14. The traction device of claim 11, wherein the device comprises two longitudinal halves, the halves splittable from each other for mounting a half on either side of an obstacle.

15. The traction device of claim 11, and further comprising a plurality of through bores within the plurality of spaced apart longitudinal ribs and/or the plurality of spaced apart transverse ribs, wherein the plurality of through bores is configured to allow mounting of the traction device to a surface.

16. The traction device of claim 15, wherein the plurality of through bores are located through at least some of the third plurality of gripping elements.

17. A traction device configured to engage a snowmobile track with a 2.52 inch pitch, a 2.86 pitch or a 3.0 inch pitch when the snowmobile moves in a direction of travel, comprising:
 a plurality of spaced apart longitudinal ribs substantially aligned with the direction of travel, a first rib of the plurality of longitudinal ribs having raised gripping elements spaced apart to engage lugs on a snowmobile track with a pitch of 3.0 inches and a second longitudinal rib of the plurality of ribs having raised gripping elements spaced apart to engage lugs on a snowmobile track with a pitch of 2.86 inches; and
 a plurality of spaced apart transverse ribs that engage the plurality of spaced apart longitudinal ribs such that a matrix is formed, wherein the plurality of spaced apart transverse ribs have a plurality of raised gripping elements across a width, wherein the spaced apart gripping elements on the transverse ribs are spaced to engage lugs on a snowmobile track with a pitch of 2.52 inches.

18. The traction device of claim 17, wherein the device comprises two longitudinal halves, the halves splittable from each other for mounting a half on either side of an obstacle.

19. The traction device of claim 17, and further comprising a plurality of through bores configured to allow mounting of the traction device to a surface.

20. The traction device of claim 17, and further comprising a plurality of through bores within the plurality of spaced apart longitudinal ribs and/or the plurality of spaced apart transverse ribs, wherein the plurality of through bores is configured to allow mounting of the traction device to a surface.

21. The traction device of claim 17, wherein the plurality of through bores are located through at least some of the plurality of raised gripping elements across the width of the plurality of spaced apart transverse ribs.

22. The traction device of claim 17, and further comprising a plurality of cutouts along a first face of each of the transverse ribs, and a plurality of cutouts along a second, opposite face of each of the transverse ribs.

23. The traction device of claim 17, wherein the plurality of raised gripping elements across the width of the transverse rib are staggered in a longitudinal direction.

24. The traction device of claim 17, and further comprising a plurality of minor gripping elements, the plurality of minor gripping elements arranged on a length thereof.

25. The traction device of claim 17, wherein each of the pluralities of gripping elements comprises a ramped surface and a substantially vertical trailing surface, the ramped surface and substantially vertical trailing surface connected by a substantially flat top surface.

26. The traction device of claim 25, wherein each substantially top flat surface has a longitudinal groove therein substantially parallel to the longitudinal ribs.

* * * * *